(12) United States Patent
Hwang et al.

(10) Patent No.: US 9,753,228 B2
(45) Date of Patent: Sep. 5, 2017

(54) OPTICAL TRANSMISSION AND RECEPTION CONNECTOR SYSTEM

(71) Applicant: KOREA PHOTONICS TECHNOLOGY INSTITUTE, Gwangju (KR)

(72) Inventors: Sung-Hwan Hwang, Gwangju (KR); Woo-Jin Lee, Gwangju (KR); Myoung-Jin Kim, Gwangju (KR); Eun-Joo Jung, Gwangju (KR); Byung-Sup Rho, Gwangju (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 0 days.

(21) Appl. No.: 14/431,807

(22) PCT Filed: Nov. 26, 2014

(86) PCT No.: PCT/KR2014/011407
§ 371 (c)(1),
(2) Date: Mar. 27, 2015

(87) PCT Pub. No.: WO2015/167100
PCT Pub. Date: May 11, 2015

(65) Prior Publication Data
US 2017/0045691 A1    Feb. 16, 2017

(30) Foreign Application Priority Data

May 2, 2014    (KR) .......................... 10-2014-0053566

(51) Int. Cl.
*G02B 6/26*    (2006.01)
*G02B 6/42*    (2006.01)
(Continued)

(52) U.S. Cl.
CPC .............. *G02B 6/356* (2013.01); *G02B 6/125* (2013.01); *G02B 6/3586* (2013.01);
(Continued)

(58) Field of Classification Search
CPC ...... G02B 6/356; G02B 6/125; G02B 6/3586; G02B 6/36; G02B 6/3826; G02B 6/3845; G02B 6/4274
(Continued)

(56) References Cited

U.S. PATENT DOCUMENTS

2014/0029639 A1\*    1/2014 Zarbock ................ H01L 25/167
372/50.1

FOREIGN PATENT DOCUMENTS

| JP | 2003-167164 | 11/2004 |
|---|---|---|
| KR | 10-1999-0045857 | 10/2000 |
| KR | 10-2012-7034340 | 3/2013 |

\* cited by examiner

*Primary Examiner* — Jerry Blevins
(74) *Attorney, Agent, or Firm* — Lex IP Meister, PLLC

(57) ABSTRACT

An optical transmission and reception connector system includes a cable that has a plug section formed at both ends thereof so as to relay and transmit light and an interfacing module that is mounted on an electronic apparatus and that includes an insertion space into which the plug section is detachably inserted. The cable is provided with a first relay optical path and a second relay optical path. The interfacing module includes a receptacle unit in which a first internal optical terminal and a second internal optical terminal for transmitting and receiving light to and from the cable are separated from each other, an optical transmitter unit, an optical receiver unit, and a main optical transmission unit that includes a first main optical path formed between the optical transmitter unit and the first internal optical terminal so as to transmit light output from the optical transmitter unit through the first internal optical terminal and a second main
(Continued)

optical path formed between the second internal optical terminal and the optical receiver unit so as to be separated from the first main optical path and to transmit light received from the second internal optical terminal to the optical receiver unit. The plug section of the cable is formed such that an upper part and a lower part are symmetric with respect to the center thereof without depending on the insertion direction thereof, and the cable or the receptacle unit is formed to divide or switch an optical path so as to enable transmission of light by the optical transmitter unit and reception of light by the optical receiver unit.

10 Claims, 9 Drawing Sheets

(51) Int. Cl.
    *G02B 6/35*         (2006.01)
    *G02B 6/125*       (2006.01)
    *G02B 6/38*         (2006.01)

(52) U.S. Cl.
    CPC ......... *G02B 6/3817* (2013.01); *G02B 6/3826* (2013.01); *G02B 6/3845* (2013.01); *G02B 6/4246* (2013.01); *G02B 6/4274* (2013.01); *G02B 6/4293* (2013.01); *G02B 6/3598* (2013.01)

(58) Field of Classification Search
    USPC .......................................... 385/22
    See application file for complete search history.

OPTICAL TRANSMISSION AND RECEPTION CONNECTOR SYSTEM

TECHNICAL FIELD

The present invention relates to an optical transmission and reception connector system, and more particularly, to an optical transmission and reception connector system that enables normal transmission and reception of a signal even when a plug section of a cable is connected in an inverted state.

BACKGROUND ART

In general, an electronic apparatus is provided with a receptacle so as to transmit and receive data between electronic apparatus through a detachable cable.

In the receptacle which is provided for an electronic apparatus and the cable, a directional plug is formed in the cable so as not to deviate terminal pin arrangements from each other at the time of mutual connection, and thus the cable can be connected to the receptacle in only a specific direction.

When a plug is directional, a user has to insert the plug into the receptacle after checking the insertion direction, which is inconvenient to the user.

In order to improve defectiveness of the directional plug, Korean Patent Application Laid-open No. 2013-0050269 discloses a structure in which a non-directional plug can be coupled to a receptacle without distinction of up and down.

Recently, various optical/electrical connectors that can transmit both an optical signal and an electrical signal have been developed. PCT International Publication No. WO2008/121731 discloses an optical universal serial bus that can transmit both an electrical signal and an optical signal.

However, the optical universal serial bus has defectiveness that it cannot be connected in an inverted state due to a directional connection structure thereof.

Particularly, in order to transmit light, an optical fiber or an optical waveguide should not be exposed from the surface of a plug and an end thereof has to be formed on a longitudinal end face facing the receptacle. When a portion for transmitting light and a portion for receiving light are separately provided, two optical ports have to be formed on the longitudinal end faces of the plug. In this case, even when the plug has a shape which can be inserted into the receptacle in an inverted state so as to be compatible with each other, there is a problem in that an optical reception port and an optical transmission port may be exchanged and normal transmission of a signal may not be enabled when the plug is mounted in an inverted state or the cable is twisted in the extending direction thereof.

DISCLOSURE OF THE INVENTION

Technical Problem

The present invention is made to improve the aforementioned problems, and an object thereof is to provide an optical transmission and reception connector system that can enable normal transmission and reception of light regardless of an insertion direction of a plug.

Another object of the present invention is to provide an optical transmission and reception connector system that can relay an electrical signal as well as an optical signal.

Technical Solution

According to an aspect of the present invention, there is provided an optical transmission and reception connector system including: a cable that has a plug section formed at both ends thereof so as to relay and transmit light; and an interfacing module that is mounted on an electronic apparatus and that includes an insertion space into which the plug section is detachably inserted, wherein the cable is provided with a first relay optical path through which light is transmitted and a second relay optical path that is separated from the first relay optical path, wherein the interfacing module includes a receptacle unit that is provided with an insertion space into which the plug section of the cable is inserted and in which a first internal optical terminal and a second internal optical terminal for transmitting and receiving light to and from the cable are separated from each other, an optical transmitter unit that outputs light to be transmitted, an optical receiver unit that receives light from the cable, and a main optical transmission unit that includes a first main optical path formed between the optical transmitter unit and the first internal optical terminal so as to transmit light output from the optical transmitter unit through the first internal optical terminal and a second main optical path formed between the second internal optical terminal and the optical receiver unit so as to be separated from the first main optical path and to transmit light received from the second internal optical terminal to the optical receiver unit, wherein the plug section of the cable is formed such that an upper part and a lower part are symmetric with respect to the center thereof so as to enable insertion and transmission of light even when one longitudinal end of the first relay optical path is correspondingly inserted into the first internal optical terminal or one longitudinal end of the second relay optical path is correspondingly inserted into the first internal optical terminal, and wherein the cable or the receptacle unit is formed to divide or switch an optical path so as to enable transmission of light by the optical transmitter unit and reception of light by the optical receiver unit even when one longitudinal end of the first relay optical path is correspondingly inserted into the first internal optical terminal or one longitudinal end of the second relay optical path is correspondingly inserted into the first internal optical terminal.

The cable may include: a first plug section in which a first optical connection terminal and a second optical connection terminal are formed to be separated from each other in correspondence with a gape between the first internal optical terminal and the second internal optical terminal and to be exposed to the outside; a second plug section in which a third optical connection terminal and a fourth optical connection terminal are formed to be separated from each other in correspondence with the gap between the first internal optical terminal and the second internal optical terminal and to be exposed to the outside on the opposite side of the first plug section; a cable body that is formed between the first plug section and the second plug section and that is provided with the first relay optical path connected between the first optical connection terminal and the third optical connection terminal so as to transmit light therebetween and the second relay optical path connected between the second optical connection terminal and the fourth optical connection terminal so as to transmit light therebetween; a first optical divider that is formed between the first relay optical path and the second relay optical path so as to divide light input through the first optical connection terminal into the first relay optical path and the second relay optical path and to divide and output light, which travels from the first relay optical path to the first optical connection terminal, to the first optical connection terminal and the second optical connection terminal; and a second optical divider that is formed between the first relay optical path and the second relay optical path so as to divide and output light, which travels from the first relay optical path to the third optical connection terminal, to the third optical connection terminal and the fourth optical connection terminal and to divide light input through the fourth optical connection terminal into the first relay optical path and the second relay optical path.

The cable body may be provided with a plurality of main wires for transmitting an electrical signal. The first and second optical connection terminals may be formed on a first longitudinal end face of the first plug section intersecting an extending direction of the cable, a plurality of first electrodes for transmitting an electrical signal may be connected to the corresponding main wires on a first surface of the first plug section intersecting the first longitudinal end face, a plurality of second electrodes for transmitting an electrical signal may be formed on a second surface opposite to the first surface of the first plug section so as to be separated from each other, and the first electrode and the second electrode located at corresponding positions in a radial direction from the center of the first plug section may be connected to each other via a common channel The third and fourth optical connection terminals may be formed on a second longitudinal end face of the second plug section intersecting the extending direction of the cable, a plurality of third electrodes for transmitting an electrical signal may be connected to the corresponding main wires on a third surface of the second plug section intersecting the second longitudinal end face, a plurality of fourth electrodes for transmitting an electrical signal may be formed on a fourth surface opposite to the third surface of the second plug section so as to be separated from each other, and the third electrode and the fourth electrode located at corresponding positions in a radial direction from the center of the second plug section may be connected to each other via a common channel.

The first optical divider may include: a first optical switch that is disposed to switch an optical path so as to transmit light input through the first optical connection terminal to one of the first relay optical path and the second optical path in response to a control signal supplied from the electronic apparatus on which the interfacing module is mounted; and a second optical switch that is disposed to switch an optical path so as to transmit light input through the second optical connection terminal to one of the first relay optical path and the second optical path in response to a control signal supplied from the electronic apparatus.

The second optical divider may include: a third optical switch that is disposed to switch an optical path so as to transmit light input through the third optical connection terminal to one of the first relay optical path and the second optical path in response to a control signal supplied from the electronic apparatus; and a fourth optical switch that is disposed to switch an optical path so as to transmit light input through the fourth optical connection terminal to one of the first relay optical path and the second optical path in response to a control signal supplied from the electronic apparatus.

The first optical divider may include: a first relay intersection path that is disposed between the first relay optical path and the second relay optical path so as to divide light input from the first optical connection terminal into the first relay optical path and the second relay optical path; a second relay intersection path that is formed at a position different from the first relay intersection path and is disposed between the first relay optical path and the second relay optical path so as to divide light traveling through the first relay optical path into the first optical connection terminal and the second optical connection terminal; a first optical switch that is disposed between the first relay optical path and one end of the first relay intersection path so as to transmit or intercept light traveling through the first relay intersection path; a second optical switch that is disposed between the second relay optical path and one end of the second relay intersection path so as to transmit or intercept light traveling through the second relay intersection path; a third optical switch that is disposed between the second relay optical path and the other end of the first relay intersection path so as to transmit or intercept light traveling through the first relay intersection path; and a fourth optical switch that is disposed between the first relay optical path and the other end of the second relay intersection path so as to transmit or intercept light traveling through the second relay intersection path.

The main optical transmission unit may further include a main optical divider that is configured to output light from the optical transmitter unit to at least one of the first internal optical terminal and the second internal optical terminal and to transmit light received through the first internal optical terminal or the second internal optical terminal from the cable to the optical receiver unit.

The main optical divider may include: a first main intersection path that is formed by intersection of the first main optical path and the second main optical path so as to transmit light input through the first internal optical terminal to the optical receiver unit; and a second main intersection path that is formed at a position different from the first main intersection path by intersection of the first main optical path and the second main optical path so as to output light from the optical transmitter unit through the second internal optical terminal.

The main optical divider may further include: a first optical switch that is disposed between the first main optical path and one end of the first main intersection path so as to transmit or intercept light traveling through the first main intersection path; and a second optical switch that is disposed between the second main optical path and one end of the second main intersection path so as to transmit or intercept light traveling through the second main intersection path.

The main optical divider may further include: a third optical switch that is disposed between the second main optical path and the other end of the first main intersection path so as to transmit or intercept light traveling through the first main intersection path; and a fourth optical switch that is disposed between the first main optical path and the other end of the second main intersection path so as to transmit or intercept light traveling through the second main intersection path.

Advantageous Effects

In the optical transmission and reception connector system according to the present invention, it is possible to insert a cable into a receptacle without distinction of up and down and to normally transmit and receive an optical signal via the cable.

BEST MODE FOR CARRYING OUT THE INVENTION

Hereinafter, an optical transmission and reception connector system according to an exemplary embodiment of the present invention will be described in detail with reference to the accompanying drawings.

Figure 1:
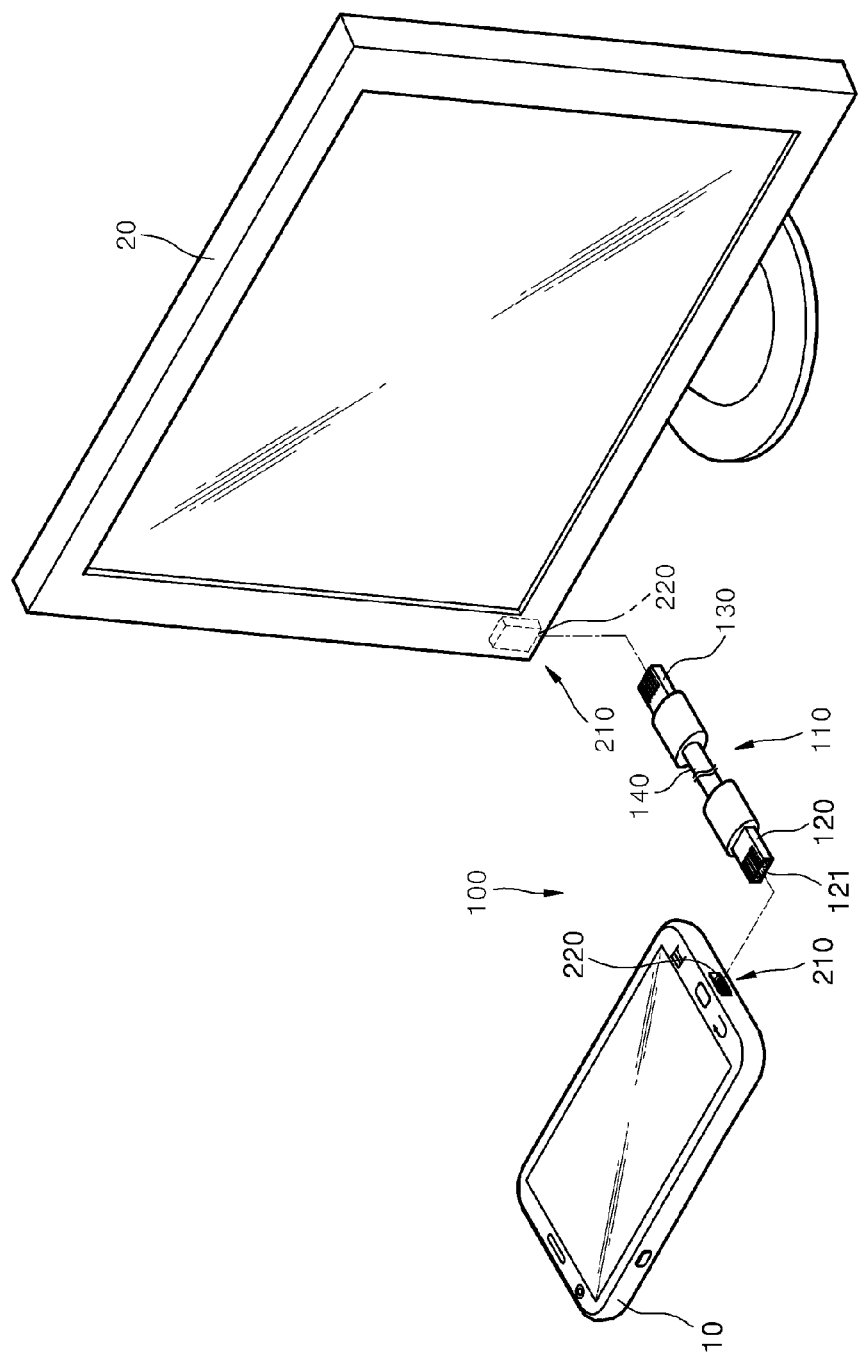
FIG. 1 is a perspective view illustrating an optical transmission and reception connector system according to a first embodiment of the present invention.
Figure 2:
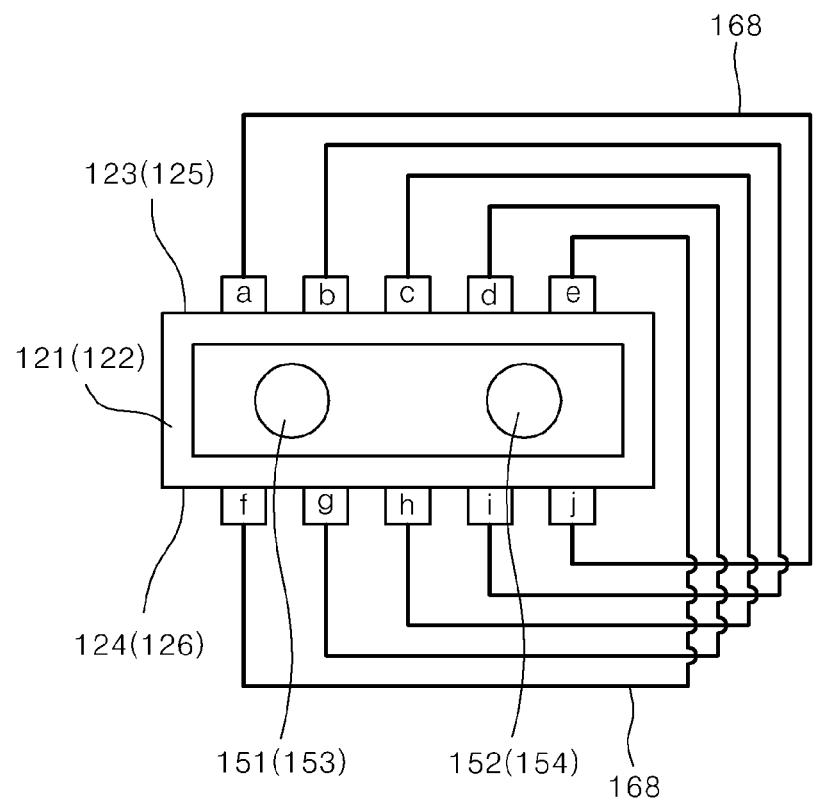
FIG. 2 is a front view of a longitudinal end face of first and second plug sections of a cable illustrated in FIG. 1.
Figure 3:
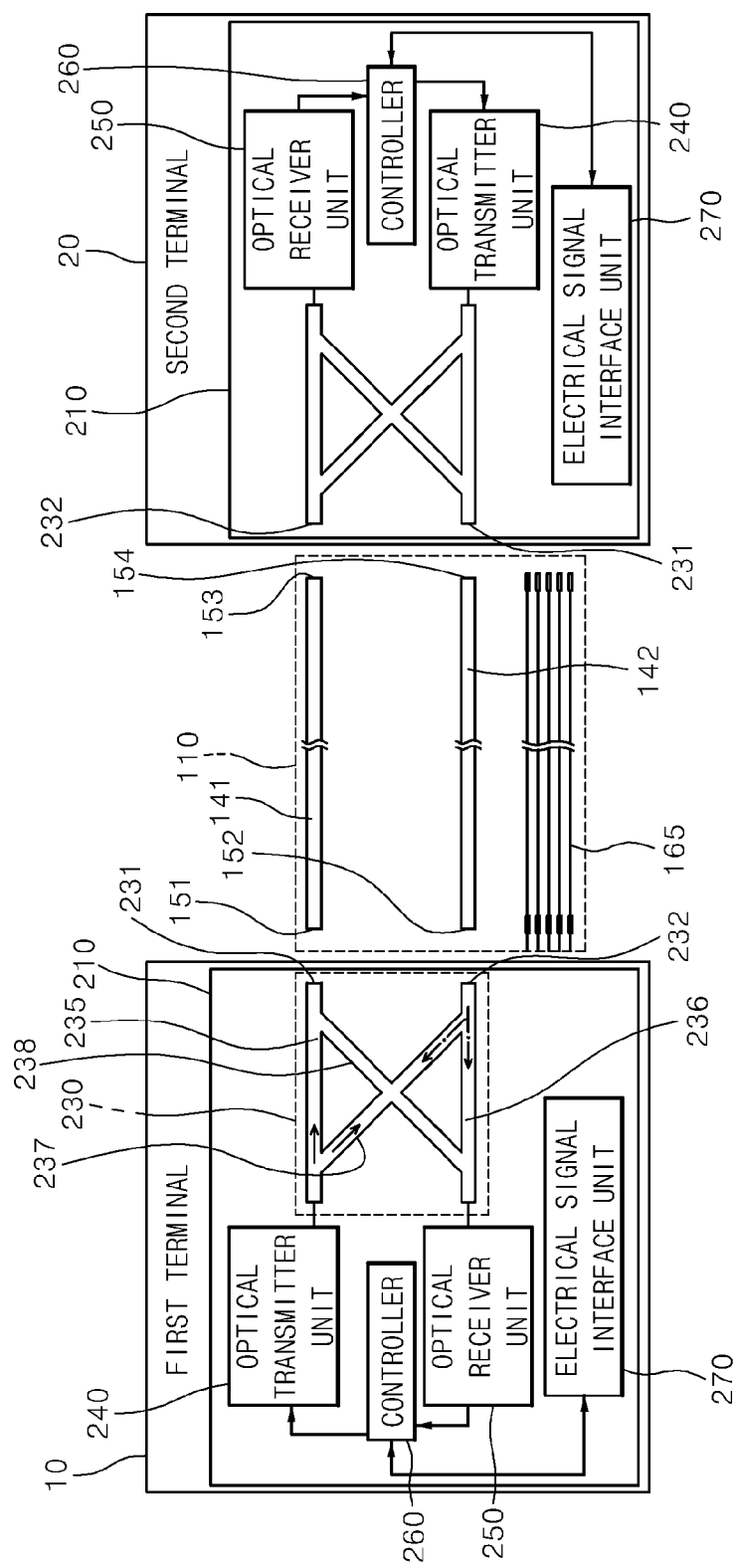
FIG. 3 is a diagram illustrating a transmission structure of an optical signal and an electrical signal of the optical transmission and reception connector system illustrated in FIG. 1.

FIG. 1 is a perspective view illustrating an optical transmission and reception connector system according to a first embodiment of the present invention. FIG. 2 is a front view of a longitudinal end face of first and second plug sections of a cable illustrated in FIG. 1. FIG. 3 is a diagram illustrating a transmission structure of an optical signal and an electrical signal of the optical transmission and reception connector system illustrated in FIG. 1.

Referring to FIGS. 1 to 3, an optical transmission and reception connector system 100 according to the present invention includes a cable 110 and interfacing modules 210.

The interfacing modules 210 have the same structure. In the example illustrated in the drawings, as examples of electronic apparatus on which the interfacing modules 210 are mounted, a smart phone is exemplified as a first terminal 10, and a display device is exemplified as a second terminal 20.

Here, the interfacing modules 210 mounted on the first terminal 10 and the second terminal 20 have the same structure. In the following description, it is assumed that an optical transmitter unit 240 for transmitting light in the interfacing module 210 of the first terminal 10 and an optical receiver unit 250 for receiving the transmitted light in the interfacing module 210 of the second terminal 20 are arranged to correspond to each other. Elements performing the same functions will be referenced by the same reference numerals.

The cable 110 can relay and transmit an electrical signal and an optical signal through first and second plug sections 120 and 130 disposed at both ends thereof.

The cable 110 is provided with a first relay optical path 141 for transmitting light and a second relay optical path 142 which is separated from the first relay optical path 141.

The cable 110 includes the first plug section 120, the second plug section 130, and a cable body 140.

The first plug section 120 has a rectangular shape, in which a first optical connection terminal 151 and a second optical connection terminal 152 are formed on a first longitudinal end face 121 in a direction perpendicular to the extending direction of the cable 110 so as to be separated from each other and exposed to the outside.

Here, the first optical connection terminal 151 and the second optical connection terminal 152 are formed to have the same gap as the gap between a first internal optical terminal 231 and a second internal optical terminal 232 disposed in the interfacing module 210 to be described later and are separated from each other at the center in the horizontal direction.

The second plug section 130 has the same shape as the first plug section 120 and is formed on the opposite side of the cable body 140 to the first plug section 120.

On a second longitudinal end face 122, which is perpendicular to the extending direction of the cable 110, of the second plug section 130, a third optical connection terminal 153 and a fourth optical connection terminal 154 are formed to be separated from each other with the same gap as the gap between first and second optical connection terminals 151 and 152 and to be exposed to the outside.

The first and second plug sections 120 and 130 have a rectangular outer shape in which an upper part and a lower part is symmetric with respect to the center thereof, and can enable insertion and transmission of light even when one longitudinal end of the first relay optical path 141 is correspondingly inserted into the first internal optical terminal 231 of the interfacing module 210 or one longitudinal end of the second relay optical path 142 is correspondingly inserted into the first internal optical terminal 231.

The cable body 140 is a section between the first plug section 120 and the second plug section 130, is formed in an appropriate length, and is provided with the first relay optical path 141 connected between the first optical connection terminal 151 and the third optical connection terminal 153 so as to transmit light therebetween and the second relay optical path 142 connected between the second optical connection terminal 152 and the fourth optical connection terminal 154 so as to transmit light therebetween.

Here, the first relay optical path 141 and the second relay optical path 142 may be formed of an optical fiber.

The first relay optical path 141 extends from the first optical connection terminal 151 of the first plug section 120 to the third optical connection terminal 153 of the second plug section 130, and the second relay optical path 142 extends from the second optical connection terminal 152 of the first plug section 120 to the fourth optical connection terminal 154 of the second plug section 130.

In the illustrated example, one end of the first relay optical path 141 serves as the first optical connection terminal 151 and the other end thereof serves as the third optical connection terminal 153. One end of the second relay optical path 142 serves as the second optical connection terminal 152 and the other end thereof serves as the fourth optical connection terminal 154.

In the cable body 140, five main wires 165 are disposed to be separated from each other. On a top surface 123 which is a first surface intersecting the first longitudinal end face 121 of the first plug section 120, five first electrodes a to e for transmitting an electrical signal are independently connected to the corresponding main wires 165. On a bottom surface 124 which is a second surface opposite to the first surface 123 of the first plug section 120, five second electrodes f to j for transmitting an electrical signal are disposed to be separated from each other.

Here, the first electrodes a to e and the second electrodes f to j located at corresponding positions in a radial direction from the center of the first plug section 120 are connected to each other via common channels 168.

That is, the first electrode a on the leftmost side of the top surface 123 is connected to the second electrode j on the rightmost of the bottom surface via the common channel 168.

Similarly, on a third surface 125 intersecting the second longitudinal end face 122 of the second plug section 130, five third electrodes a to e for transmitting an electrical signal are disposed to be independently connected to the corresponding main wires 165. On a fourth surface 126 opposite to the third surface, five fourth electrodes f to j for transmitting an electrical signal are disposed to be separated from each other.

The third electrodes a to e and the fourth electrodes f to j located at corresponding positions in a radial direction from the center of the second plug section 130 are connected to each other via common channels 168 in the same way that the first and second electrodes formed in the first plug section 120 are connected to each other.

Here, the number of first electrodes a to e, the number of second electrodes f to j, the number of third electrodes a to e, and the number of fourth electrodes f to j are set to the same value.

In the illustrated example, the number of electrodes independently functioning is set to 5, but the number of electrodes can be appropriately changed.

According to this structure, the same electrode arrangement structure is provided at the time of connection to an electrical signal interface unit 270 disposed in the interfacing module 210 even when the first plug section 120 and the second plug section 130 are connected in an inverted state or the cable body 140 is twisted in the extending direction.

Here, the electrical signal interface unit 270 is electrically connected to the corresponding electrodes to transmit and receive an electrical signal at the time of connection to the first plug section 120 or the second plug section 130 of the cable 110.

Figure 4:
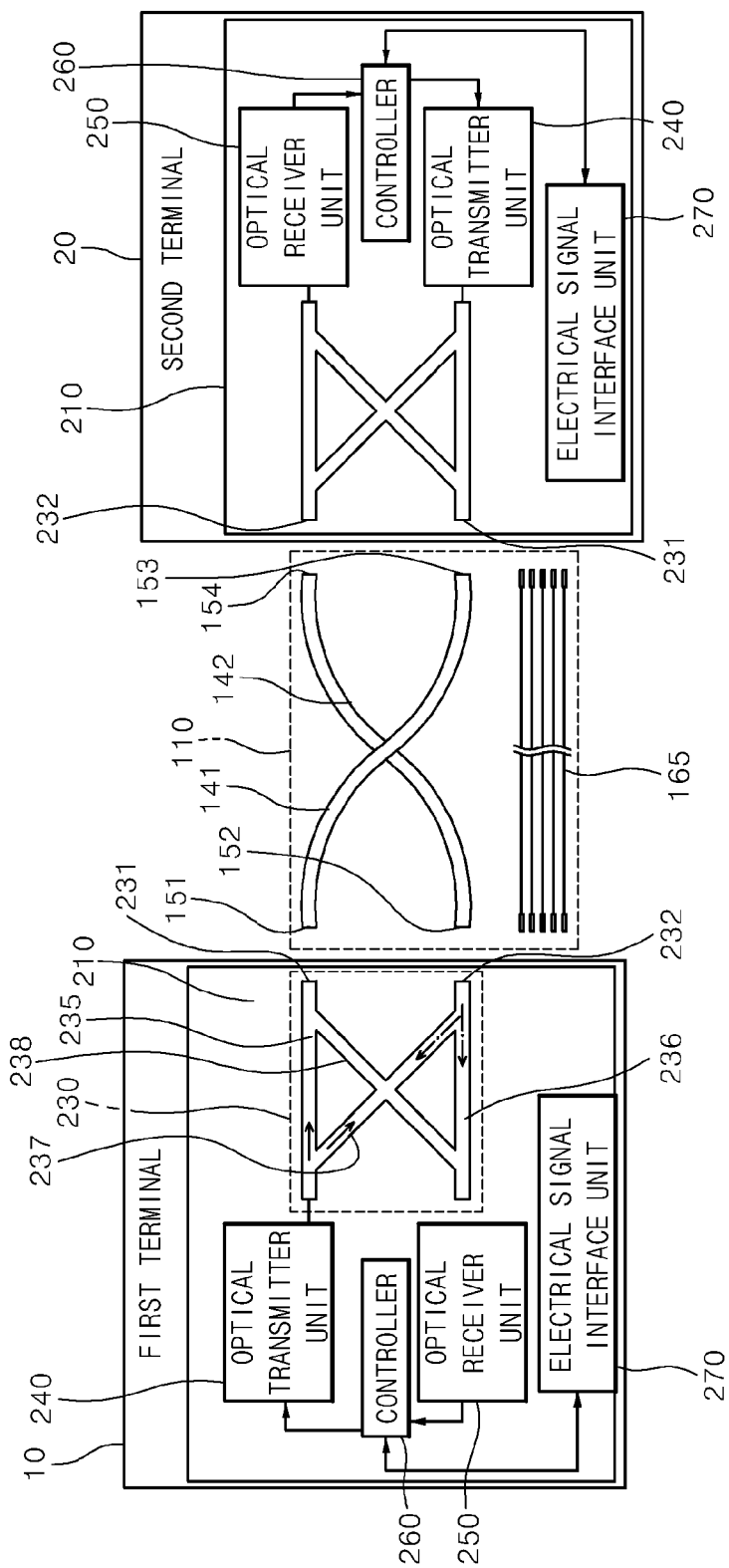
FIG. 4 illustrating a state in which a cable illustrated in FIG. 3 is twisted and inserted into an interfacing module.

On the other hand, in the illustrated example, the cable 110 has a structure in which the first and second relay optical paths 141 and 142 are separated from each other to independently transmit light. Regarding light transmission paths of transmission light and reception light, light can be divided and transmitted to and received from the interfacing module 210 so as to normally transmit and receive light even when the plug sections 120 and 130 are inverted and inserted or the cable body 140 is twisted in the extending direction and the cable 110 is connected to the interfacing modules 210 of the first and second terminals 10 and 20 as illustrated in FIG. 4, unlike FIG. 3.

More specifically, the interfacing module 210 includes a receptacle unit 220, a main optical transmission unit 230, an optical transmitter unit 240, an optical receiver unit 250, and a controller 260.

The receptacle unit 220 is provided with an insertion space into which the first plug section 120 or the second plug section 130 of the cable 110 is inserted, and the first internal optical terminal 231 and the second internal optical terminal 232 for transmitting and receiving light to and from the cable 110 are separated from each other.

The receptacle unit 220 is provided with the electrical signal interface unit 270 that is connected to the first and second electrodes a to j or the third and fourth electrodes a to j so as to relay an electrical signal when the first plug section 120 or the second plug section 130 are connected thereto.

The optical transmitter unit 240 outputs light to be transmitted through a first main optical path 235.

The optical receiver unit 250 receives light from the cable 110.

The main optical transmission unit 230 includes a first main optical path 235 that is formed between the optical transmitter unit 240 and the first internal optical terminal 231 so as to transmit light output from the optical transmitter unit 240 to the first internal optical terminal 231 and a second main optical path 236 that is formed to be separated from the first main optical path 235 between the second internal optical terminal 232 and the optical receiver unit 250 so as to transmit light received from the second internal optical terminal 232 to the optical receiver unit 250.

The main optical transmission unit 230 is provided with a main optical divider that is configured to divide and output light from the optical transmitter unit 240 to the first internal optical terminal 231 and the second internal optical terminal 232 and to divide and transmit light received through the first internal optical terminal 231 or the second internal optical terminal 232 from the cable 110 to the optical receiver unit 250.

The main optical divider includes a first main intersection path 237 that is formed by intersection of the first main optical path 235 and the second main optical path 236 so as to output light from the optical transmitter unit 240 to the first internal optical terminal 231 and the second internal optical terminal 232 so as to divide and transmit light output from the optical transmitter unit 240 and a second main intersection path 238 that is formed at a position different from the first main intersection path 237 by intersection of the first main optical path 235 and the second main optical path 236 so as to transmit light input through the first internal optical terminal 231 to the optical receiver unit 250.

Here, the first main intersection path 237 and the second main intersection path 238 are formed in an "X" shape between the first main optical path 235 and the second main optical path 236.

In this case, transmission light indicated by a solid arrow or reception light indicated by a one-dot chain arrow may be divided and transmitted or received, thereby enabling normal transmission and reception of light.

In order to cope with transmission light and reception light having different wavelengths and to enhance transmission and reception efficiency, the optical receiver unit 250 may be provided with a filter (not illustrated) capable of transmitting only light of a wavelength band to be received.

The main optical transmission unit 230 may be formed in a planar optical waveguide structure or may be constructed by an optical fiber.

On the other hand, in order to suppress a decrease in optical efficiency due to division of light, the main optical transmission unit may be constructed to determine whether light is normally received through the optical receiver unit 250 and to adjust a transmission optical path and a reception optical path. An example thereof will be described with reference to FIG. 5.

Figure 5:
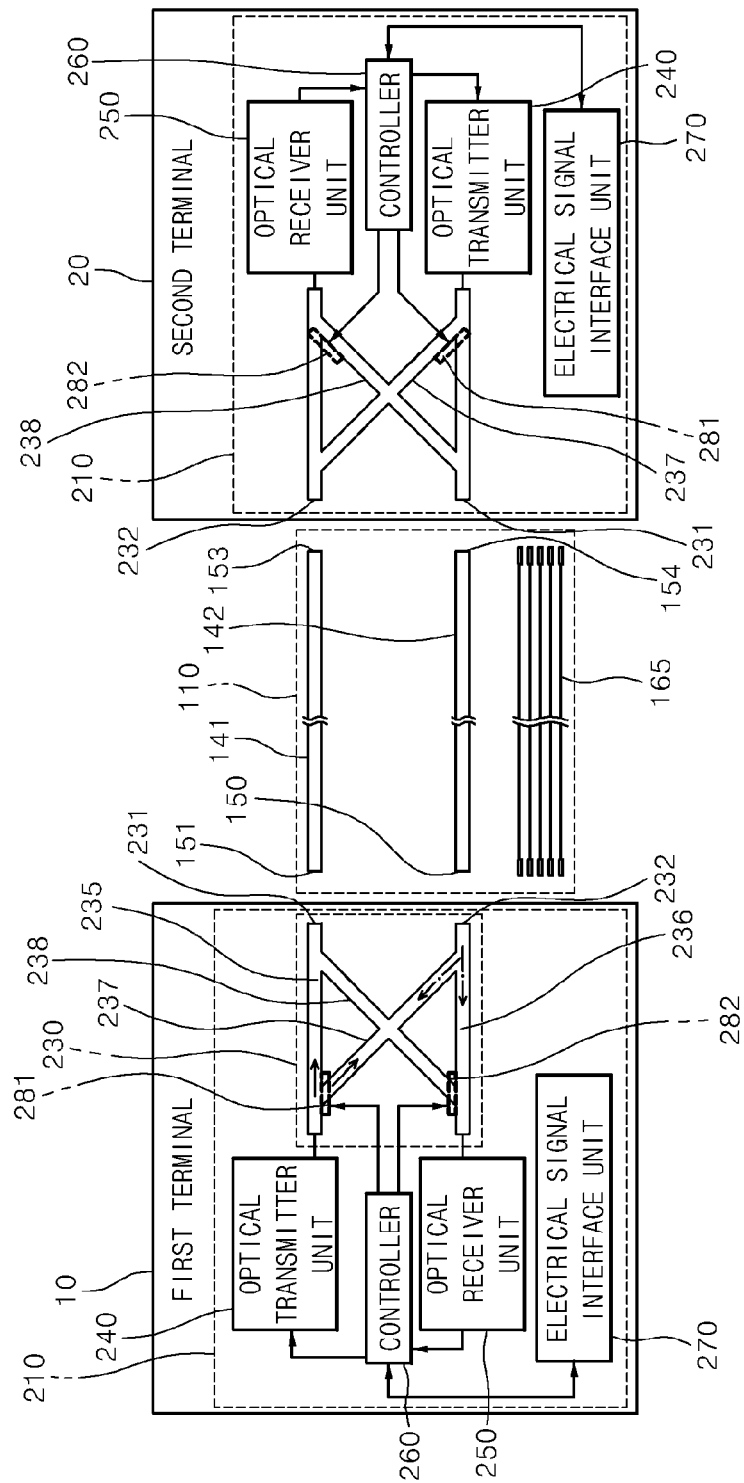
FIG. 5 is a diagram illustrating a transmission structure of an optical signal and an electrical signal of an optical transmission and reception connector system according to a second embodiment of the present invention.

Referring to FIG. 5, the main optical divider may include a first optical switch 281 that is disposed at one end of the first main intersection path 237 coming into contact with the first main optical path 235 so as to transmit or intercept light traveling through the first main intersection path 237 and a second optical switch 282 that is disposed at one end of the second main intersection path 238 coming into contact with the second main optical path 236 so as to transmit or intercept light traveling through the second main intersection path 238.

That is, the first optical switch 281 is configured to output light through only the first main optical path 235 between the optical transmitter unit 240 and the first internal optical terminal 231 in a first mode of the first terminal 10, and to output light from the optical transmitter unit 240 to only the second internal optical terminal 232 through the first main intersection path 237 in a second mode of the second terminal 20.

Here, the first optical switch 281 is controlled by the controller 260 that receives a signal output from the optical receiver unit 250 and determines whether light is received by the optical receiver unit 250.

The second optical switch 282 is also controlled by the controller 260 in the same way that the first optical switch 281 is controlled and may adjust the optical path to and from the optical receiver unit 250 so as to transmit light to the first internal optical terminal 231 through only the second main intersection path 238 or to transmit light from the second internal optical terminal 232 to only the optical receiver unit 250 through the second main optical path 236.

By employing the first and second optical switches 281 and 282, when the controller 260 determines that light is not received by the optical receiver unit 250 based on a signal output from the optical receiver unit 250 in a state in which the first and second optical switches 281 and 282 are set to transmit light through only the first main optical path 235 and the second main optical path 236 in an initial default state, the modes of the first and second optical switches 281 and 282 are adjusted as described above and then the optical transmission direction and the optical reception direction in the cable 110 may be switched to enable normal transmission and reception of light.

Figure 6:
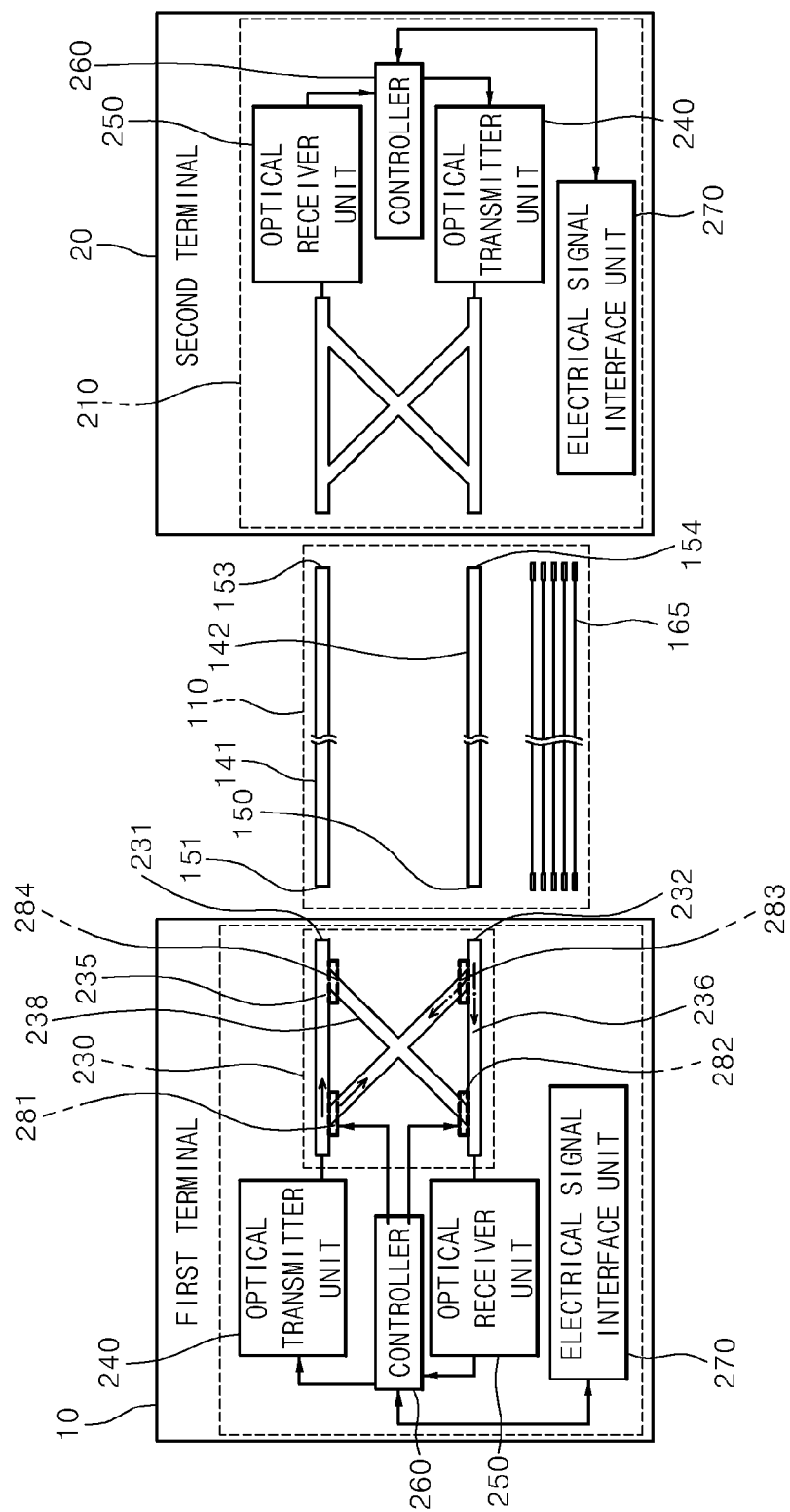
FIG. 6 is a diagram illustrating a transmission structure of an optical signal and an electrical signal of an optical transmission and reception connector system according to a third embodiment of the present invention.

On the other hand, as illustrated in FIG. 6, the other end of the first main intersection path 237 may be provided with a third optical switch 283, the other end of the second main intersection path 238 may be provided with a fourth optical switch 284, and the first to fourth optical switches 281 to 284 may adjust the optical path under the control of the controller 260.

Here, the third optical switch 283 may be disposed at the other end of the first main intersection path 237 coming into contact with the second main optical path 236 so as to transmit or intercept light traveling through the first main intersection path 237, and the fourth optical switch 284 is disposed at the other end of the second main intersection path 238 coming into contact with the first main optical path 235 so as to transmit or intercept light traveling through the second main intersection path 238.

Although not illustrated, the interfacing module 210 of the second terminal 20 may include the same switches as in the interfacing module 210 of the first terminal 10.

Unlike the illustrated example, light may be divided in the cable 110 and light may be transmitted or received without depending on the connection directions of the first to fourth optical connection terminals 151 to 154. An example thereof will be described with reference to FIG. 7. Elements performing the same functions as described above with reference to the drawings will be referenced by the same reference numerals.

Figure 7:
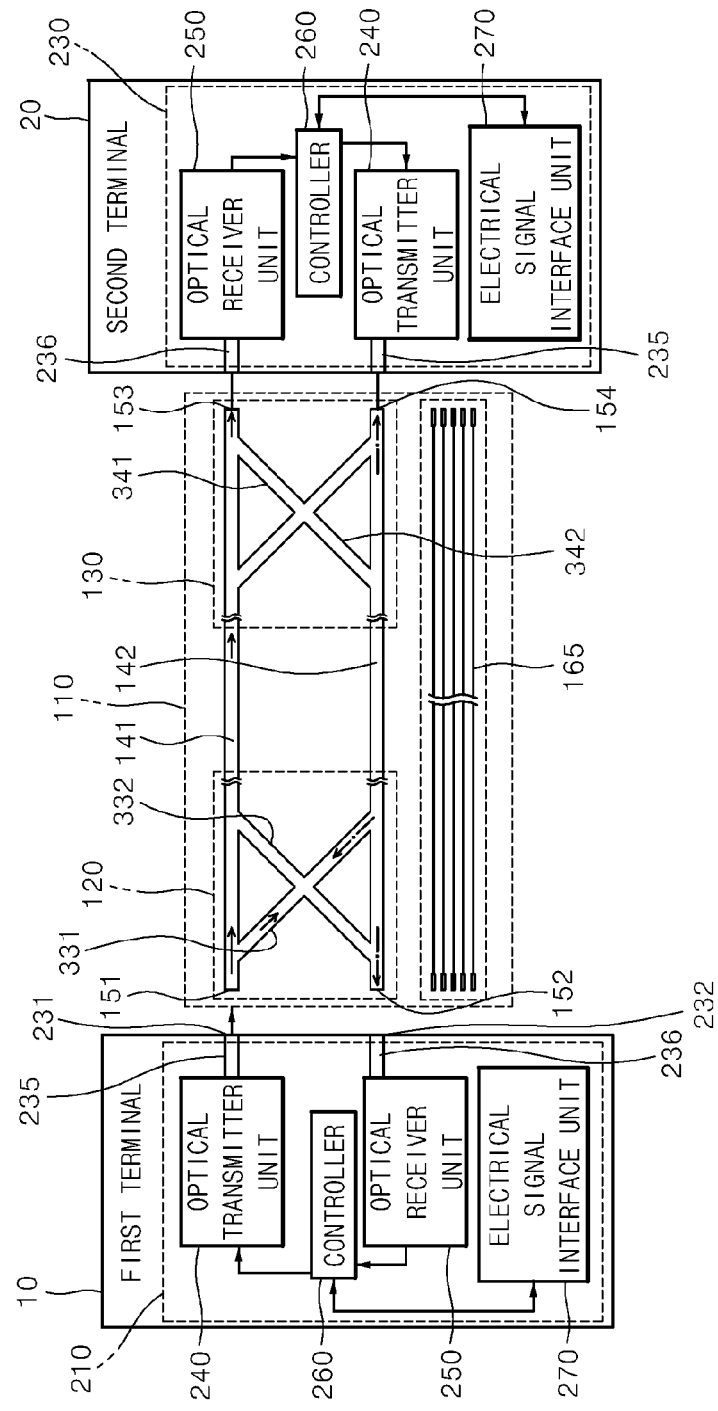
FIG. 7 is a diagram illustrating a transmission structure of an optical signal and an electrical signal of an optical transmission and reception connector system according to a fourth embodiment of the present invention.

Referring to FIG. 7, the cable 110 further includes a first optical divider and a second optical divider.

The first optical divider is formed between the first relay optical path 141 and the second relay optical path 142 in the first plug section 120 so as to divide light input through the first optical connection terminal 151 into the first relay optical path 141 and the second relay optical path 142 and to divide and output light, which travels from the first relay optical path 141 to the first optical connection terminal 151, to the first optical connection terminal 151 and the second optical connection terminal 152.

The first optical divider includes a first relay intersection path 331 of which one end is connected to the first relay optical path 141 located at a position separated from the first optical connection terminal 151 and the other end is connected to the second relay optical path 142 and a second relay intersection path 332 of which one end is connected to the first relay optical path 141 farther separated from the first optical connection terminal 151 than one end of the first relay intersection path 331 and the other end is connected to the second relay optical path 142.

The second optical divider is formed between the first relay optical path 141 and the second relay optical path 142 in the second plug section 130 so as to divide light input through the third optical connection terminal 153 into the first relay optical path 141 and the second relay optical path 142 and to divide and output light, which travels from the first relay optical path 141 to the third optical connection terminal 153, to the third optical connection terminal 153 and the fourth optical connection terminal 154.

The second optical divider includes a third relay intersection path 341 of which one end is connected to the first relay optical path 141 and the other end is connected to the second relay optical path 142 and a fourth relay intersection path 342 of which one end is connected to the first relay optical path 141 at a position different from the third relay intersection path 341 and the other end is connected to the second relay optical path 142.

In this case, the main optical transmission unit 230 of the interfacing module 210 may include only the first main optical path 235 and the second main optical path 236.

The first and second optical dividers may be formed by bonding optical fibers or may be formed in an optical waveguide manner as described above.

Figure 8:
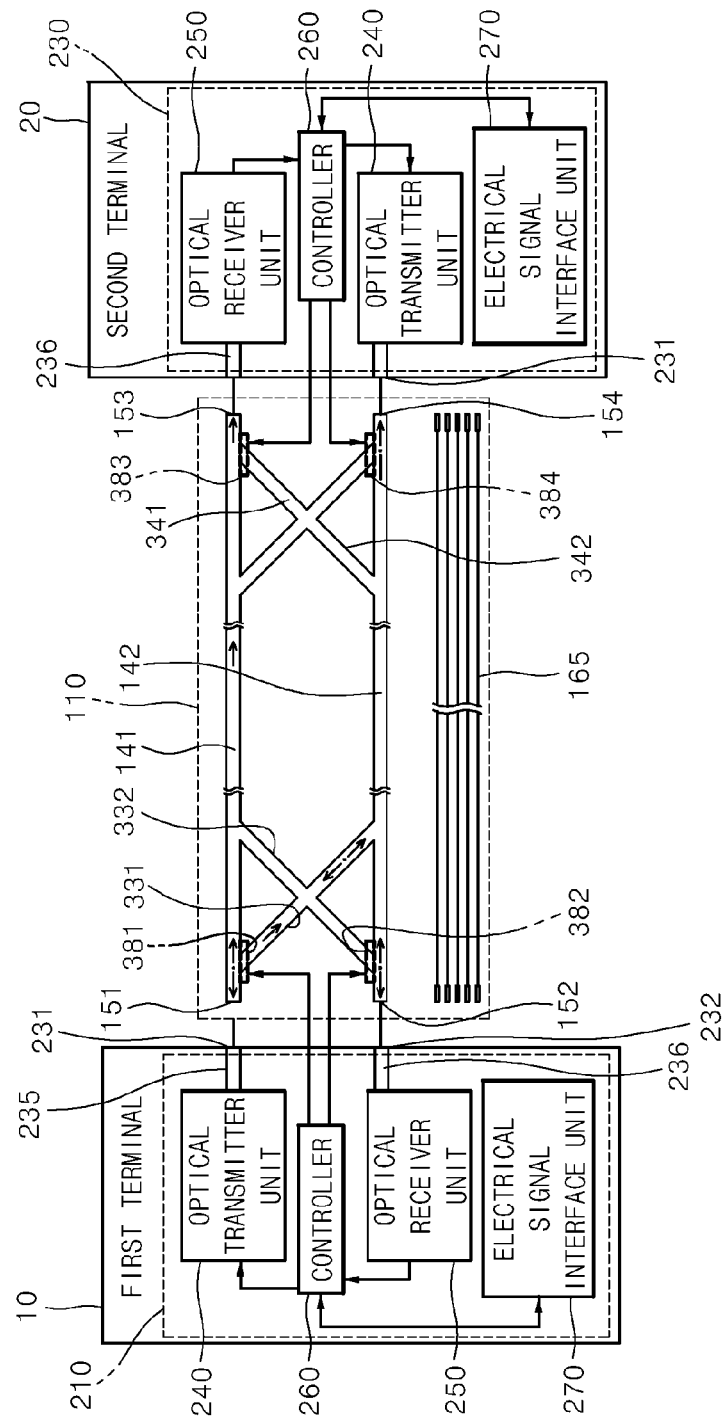
FIG. 8 is a diagram illustrating a transmission structure of an optical signal and an electrical signal of an optical transmission and reception connector system according to a fifth embodiment of the present invention.

On the other hand, in order to enhance optical efficiency, the first optical divider and the second optical divider may be configured to switch an optical path in the same way as in the optical switches employed by the interfacing module 210 under the control as illustrated in FIG. 8.

A first optical switch 381 may be disposed to switch an optical path so as to transmit light input through the first optical connection terminal 151 to one of the first relay optical path 141 and the second relay optical path 142 in response to a control signal supplied from the controller 260 of the first terminal 10 or the second terminal 20 on which the interfacing module 210 is mounted, as described above in conjunction with the first relay intersection path 331 and the second relay intersection path 332.

That is, the first optical switch 381 is disposed at one end of the first relay intersection path 331 coming into contact with the first relay optical path 141 and adjust an optical path so as to transmit light input through the first optical connection terminal 151 through only the first relay intersection path 331 or to intercept light traveling through the relay intersection path 331 and to transmit light through only the first relay optical path 141.

Similarly, a second optical switch 382 may be disposed at one end of the second relay intersection path 332 coming into contact with the second relay optical path 142 so as to transmit light, which is input through the second optical connection terminal 232, through the second relay intersection path 332 and the first relay optical path 141 or to transmit light through only the second relay optical path 142 in response to a control signal supplied from the controller 260 of the first terminal 10 or the second terminal 20.

A third optical switch 383 may be disposed at one end of the third relay intersection path 341 and a fourth optical switch 384 may be disposed at one end of the fourth relay intersection path 342, so as to adjust an optical path at the intersection to one thereof in the same way as in the first and second optical switches 381 and 382.

That is, the third optical switch 383 switches an optical path so as to transmit light, which is input through the third optical connection terminal 153, through one of the first relay optical path 141 and the second relay optical path 142, and the fourth optical switch 384 switches an optical path so as to transmit light, which is input through the fourth optical connection terminal 154, to one of the first relay optical path 141 and the second relay optical path 142.

The third optical switch 383 and the fourth optical switch 384 are also configured to adjust the traveling direction of light input through the third optical connection terminal 153 or the fourth optical connection terminal 154 as described above in response to a control signal supplied from the controller 260 of the first terminal 10 or the second terminal 20.

Figure 9:
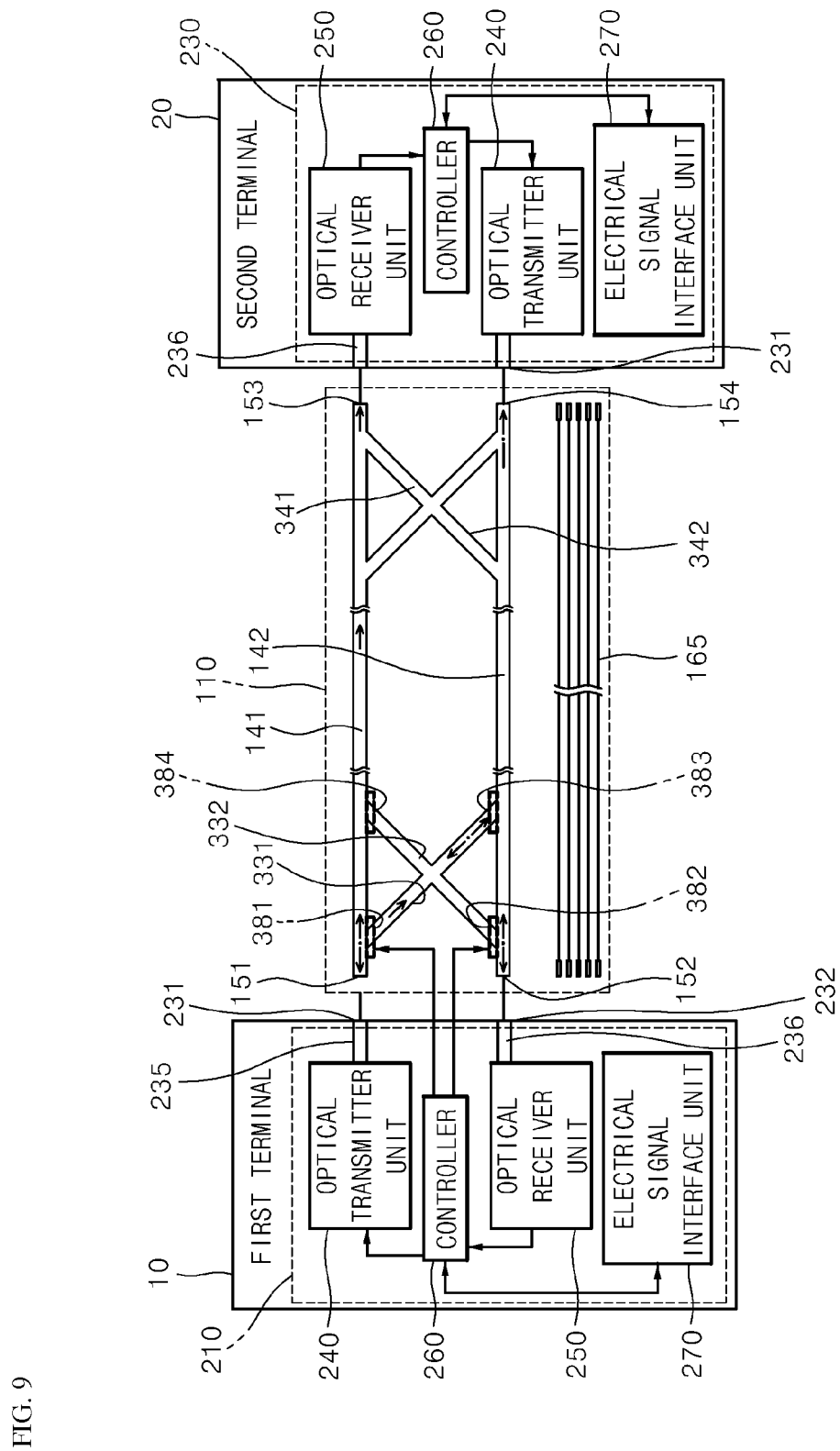
FIG. 9 is a diagram illustrating a transmission structure of an optical signal and an electrical signal of an optical transmission and reception connector system according to a sixth embodiment of the present invention.

As illustrated in FIG. 9, alternatively, the optical switches may be disposed at intersections between the first and second relay optical paths 141 and 142 and the first and second relay intersection paths 331 and 332 in only the first plug section 120.

That is, the third optical switch 383 may be disposed at the other end of the first relay intersection path 331 so as to transmit or intercept light traveling through the first relay intersection path 331, and the fourth optical switch 384 may be disposed at the other end of the second relay intersection path 332 so as to transmit or intercept light traveling through the second relay intersection path 332.

In this case, the first to fourth optical switches 381 to 384 may be connected to the controller 260 of the interfacing module 210 via a specific electrode formed in the first plug section 120 and the driving thereof may be controlled by the controller 260.

On the other hand, the second plug section 130 may be provided with four optical switches, similarly to the first plug section 120.

As described above, in the optical transmission and reception connector system according to the present invention, the cable 110 can be connected without distinction of up and down and light can be normally transmitted and received through the cable 110.

The invention claimed is:

1. An optical transmission and reception connector system comprising:
   a cable that has a plug section formed at both ends thereof so as to relay and transmit light; and
   an interfacing module that is mounted on an electronic apparatus and that includes an insertion space into which the plug section is detachably inserted,
   wherein the cable is provided with a first relay optical path through which light is transmitted and a second relay optical path that is separated from the first relay optical path,
   wherein the interfacing module includes
      a receptacle unit that is provided with the insertion space into which the plug section of the cable is inserted and in which a first internal optical terminal and a second internal optical terminal for transmitting and receiving light to and from the cable are separated from each other,
      an optical transmitter unit that outputs light to be transmitted,
      an optical receiver unit that receives light from the cable, and
      a main optical transmission unit that includes a first main optical path formed between the optical transmitter unit and the first internal optical terminal so as to transmit light output from the optical transmitter unit through the first internal optical terminal and a second main optical path formed between the second internal optical terminal and the optical receiver unit so as to be separated from the first main optical path and to transmit light received from the second internal optical terminal to the optical receiver unit,
   wherein the plug section of the cable is formed such that an upper part and a lower part are symmetric with respect to the center thereof so as to enable insertion and transmission of light even when one longitudinal end of the first relay optical path is correspondingly inserted into the first internal optical terminal or one longitudinal end of the second relay optical path is correspondingly inserted into the first internal optical terminal, and
   wherein the cable or the receptacle unit is formed to divide or switch an optical path so as to enable transmission of light by the optical transmitter unit and reception of light by the optical receiver unit even when one longitudinal end of the first relay optical path is correspondingly inserted into the first internal optical terminal or one longitudinal end of the second relay optical path is correspondingly inserted into the first internal optical terminal.

2. The optical transmission and reception connector system according to claim 1, wherein the cable includes:
   a first plug section in which a first optical connection terminal and a second optical connection terminal are formed to be separated from each other in correspondence with a gap between the first internal optical terminal and the second internal optical terminal and to be exposed to the outside;
   a second plug section in which a third optical connection terminal and a fourth optical connection terminal are formed to be separated from each other in correspondence with the gap between the first internal optical terminal and the second internal optical terminal and to be exposed to the outside on the opposite side of the first plug section;
   a cable body that is formed between the first plug section and the second plug section and that is provided with the first relay optical path connected between the first optical connection terminal and the third optical connection terminal so as to transmit light therebetween and the second relay optical path connected between the second optical connection terminal and the fourth optical connection terminal so as to transmit light therebetween;
   a first optical divider that is formed between the first relay optical path and the second relay optical path so as to divide light input through the first optical connection terminal into the first relay optical path and the second relay optical path and to divide and output light, which travels from the first relay optical path to the first optical connection terminal, to the first optical connection terminal and the second optical connection terminal; and
a second optical divider that is formed between the first relay optical path and the second relay optical path so as to divide and output light, which travels from the first relay optical path to the third optical connection terminal, to the third optical connection terminal and the fourth optical connection terminal and to divide light input through the fourth optical connection terminal into the first relay optical path and the second relay optical path.

3. The optical transmission and reception connector system according to claim 2, wherein the cable body is provided with a plurality of main wires for transmitting an electrical signal,
wherein the first and second optical connection terminals are formed on a first longitudinal end face of the first plug section intersecting an extending direction of the cable, a plurality of first electrodes for transmitting an electrical signal are connected to the corresponding main wires on a first surface of the first plug section intersecting the first longitudinal end face, a plurality of second electrodes for transmitting an electrical signal are formed on a second surface opposite to the first surface of the first plug section so as to be separated from each other, and the first electrode and the second electrode located at corresponding positions in a radial direction from the center of the first plug section are connected to each other via a common channel, and
wherein the third and fourth optical connection terminals are formed on a second longitudinal end face of the second plug section intersecting the extending direction of the cable, a plurality of third electrodes for transmitting an electrical signal are connected to the corresponding main wires on a third surface of the second plug section intersecting the second longitudinal end face, a plurality of fourth electrodes for transmitting an electrical signal are formed on a fourth surface opposite to the third surface of the second plug section so as to be separated from each other, and the third electrode and the fourth electrode located at corresponding positions in a radial direction from the center of the second plug section are connected to each other via a common channel.

4. The optical transmission and reception connector system according to claim 3, wherein the first optical divider includes:
a first optical switch that is disposed to switch an optical path so as to transmit light input through the first optical connection terminal to one of the first relay optical path and the second optical path in response to a control signal supplied from the electronic apparatus on which the interfacing module is mounted; and
a second optical switch that is disposed to switch an optical path so as to transmit light input through the second optical connection terminal to one of the first relay optical path and the second optical path in response to a control signal supplied from the electronic apparatus.

5. The optical transmission and reception connector system according to claim 4, wherein the second optical divider includes:
a third optical switch that is disposed to switch an optical path so as to transmit light input through the third optical connection terminal to one of the first relay optical path and the second optical path in response to a control signal supplied from the electronic apparatus; and
a fourth optical switch that is disposed to switch an optical path so as to transmit light input through the fourth optical connection terminal to one of the first relay optical path and the second optical path in response to a control signal supplied from the electronic apparatus.

6. The optical transmission and reception connector system according to claim 3, wherein the first optical divider includes:
a first relay intersection path that is disposed between the first relay optical path and the second relay optical path so as to divide light input from the first optical connection terminal into the first relay optical path and the second relay optical path;
a second relay intersection path that is formed at a position different from the first relay intersection path and is disposed between the first relay optical path and the second relay optical path so as to divide light traveling through the first relay optical path into the first optical connection terminal and the second optical connection terminal;
a first optical switch that is disposed between the first relay optical path and one end of the first relay intersection path so as to transmit or intercept light traveling through the first relay intersection path;
a second optical switch that is disposed between the second relay optical path and one end of the second relay intersection path so as to transmit or intercept light traveling through the second relay intersection path;
a third optical switch that is disposed between the second relay optical path and the other end of the first relay intersection path so as to transmit or intercept light traveling through the first relay intersection path; and
a fourth optical switch that is disposed between the first relay optical path and the other end of the second relay intersection path so as to transmit or intercept light traveling through the second relay intersection path.

7. The optical transmission and reception connector system according to claim 1, wherein the main optical transmission unit further includes a main optical divider that is configured to output light from the optical transmitter unit to at least one of the first internal optical terminal and the second internal optical terminal and to transmit light received through the first internal optical terminal or the second internal optical terminal from the cable to the optical receiver unit.

8. The optical transmission and reception connector system according to claim 7, wherein the main optical divider includes:
a first main intersection path that is formed by intersection of the first main optical path and the second main optical path so as to transmit light input through the first internal optical terminal to the optical receiver unit; and
a second main intersection path that is formed at a position different from the first main intersection path by intersection of the first main optical path and the second main optical path so as to output light from the optical transmitter unit through the second internal optical terminal.

9. The optical transmission and reception connector system according to claim 8, wherein the main optical divider further includes:
a first optical switch that is disposed between the first main optical path and one end of the first main intersection path so as to transmit or intercept light traveling through the first main intersection path; and a second optical switch that is disposed between the second main optical path and one end of the second main intersection path so as to transmit or intercept light traveling through the second main intersection path.

10. The optical transmission and reception connector system according to claim 9, wherein the main optical divider further includes:

a third optical switch that is disposed between the second main optical path and the other end of the first main intersection path so as to transmit or intercept light traveling through the first main intersection path; and a fourth optical switch that is disposed between the first main optical path and the other end of the second main intersection path so as to transmit or intercept light traveling through the second main intersection path.

* * * * *